Feb. 16, 1971 T. J. GUNNELL 3,563,706
PRODUCTION OF CARBON BLACK
Filed Dec. 29, 1967 2 Sheets-Sheet 1

INVENTOR.
T. J. GUNNELL
BY
*Young and Quigg*
ATTORNEYS

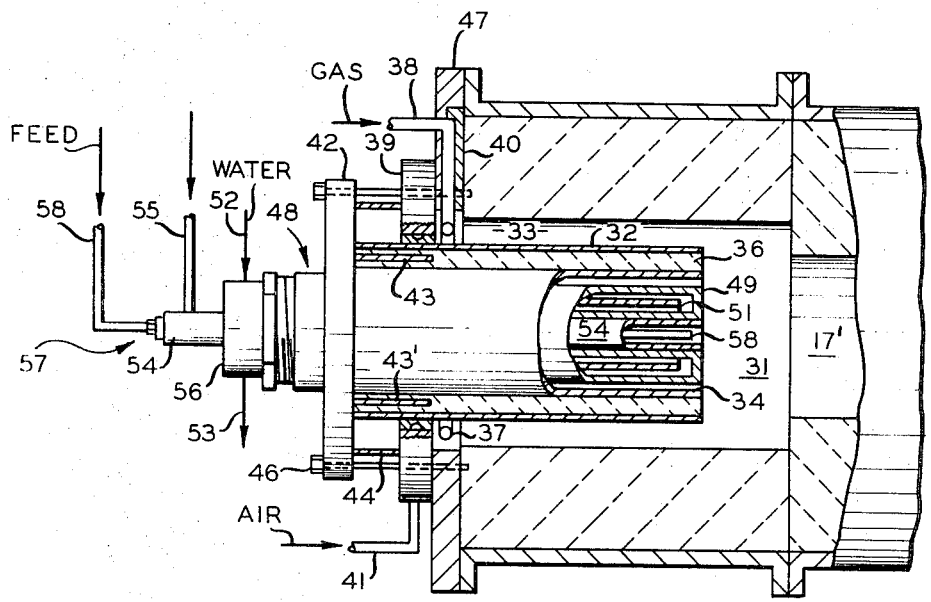

United States Patent Office 3,563,706
Patented Feb. 16, 1971

3,563,706
PRODUCTION OF CARBON BLACK
Thomas J. Gunnell, Bartlesville, Okla., assignor to Phillips Petroleum Company, a corporation of Delaware
Continuation-in-part of application Ser. No. 604,262, Dec. 23, 1966. This application Dec. 29, 1967, Ser. No. 694,563
Int. Cl. C09c 1/50
U.S. Cl. 23—209.4      8 Claims

ABSTRACT OF THE DISCLOSURE

Carbon black is produced in increased yield by contacting a hydrocarbon feedstock with a first stream of hot combustion gases produced by burning a combustible mixture of a hydrocarbon fuel and an oxidant which contains more than the stoichiometric amount of oxidant required for the burning of said fuel, and contacting the resulting reaction mixture with a stream of hot combustion gases produced by burning a combustible mixture of a hydrocarbon fuel and an oxidant which contains less than the stoichiometric amount of oxidant required for the burning of said fuel. Apparatus is also disclosed.

---

This application is a continuation-in-part of my copending application Ser. No. 604,262, filed Dec. 23, 1966 now U.S. Patent 3,431,075.

This invention relates to the production of carbon black.

For several years carbon black has been produced in large quantities in furnaces. In one particularly outstanding successful process, a furnace is employed which comprises a generally cylindrical first section or zone having a diameter greater than its length. Said first section or zone is axially aligned with and in open communication with a second section or zone having a length greater than its diameter and a diameter less than the diameter of said first section. A fuel and an oxidant in combustible proportions are introduced into at least one tunnel combustion zone which communicates with said first zone. Combustion of said fuel and said oxidant is substantially completed in said tunnel and the resulting hot combustion gases are introduced into said first zone. A hydrocarbon feedstock is introduced along the longitudinal axis of said first zone and while surrounded by a moving blanket of said hot combustion gases passes into said axially aligned second zone. Carbon black is formed in said first and second sections or zones by the decomposition of said feedstock and recovered from the gaseous effluent from said second section or zone.

When the combustible mixture which is burned to supply said hot combustion gases is essentially a stoichiometric mixture, the heat release obtained approaches the maximum and the resulting temperatures are excessive for most commercially available refractory materials. Thus, a common practice in the operation of such furnaces as described above in accordance with the prior art is to burn a combustible mixture in said tunnel inlet zones which contains an excess of oxidant, e.g., air.

It is desirable for economic reasons to obtain the maximum yield of carbon black. In accordance with the invention of said copending application, the yield of carbon black can be increased by operating in a manner to supply to said first zone at least one stream of hot combustion gases obtained by burning a combustible mixture of a hydrocarbon fuel and an oxidant which contains less than the stoichiometric amount of oxidant required for the burning of said fuel, and supplying to said first zone at least one other stream of hot combustion gases obtained by burning a combustible mixture of a hydrocarbon fuel and an oxidant containing an amount of oxidant which is greater than the stoichiometric amount required for the burning of said fuel. Such operating conditions are referred to as "unbalanced stoichiometric conditions." In contrast, when the combustible mixture burned is the same for the one stream as for the other stream, the stoichiometry is referred to as "balanced stoichiometric conditions."

The present invention also employs an unbalanced stoichiometry. I have now discovered that even greater yields of carbon black product can be obtained if the feedstock is contacted first with a stream of hot oxidizing gases, and then contacting the resulting reaction mixture with a stream of hot combustion gases obtained by burning a combustible mixture of a hydrocarbon fuel and an oxidant which contains less than the stoichiometric amount of oxidant required for the burning of said fuel. Thus, in some respects at least, the present invention is an improvement on the invention of said copending application.

Thus, broadly speaking, the present invention resides in first contacting a hydrocarbon feedstock with a stream or mass of hot oxidizing gases and then contacting the resulting reaction mixture with a fuel-rich mixture of hot combustion gases, and recovering carbon black product from the final reaction mixture.

An object of this invention is to provide an improved process for the production of carbon black. Another object of this invention is to provide an improved process for producing furnace carbon blacks in increased yield. Another object of this invention is to provide a process for producing an increased yield of a furnace carbon black from a hydrocarbon feedstock without subjecting the refractories of the carbon black furnace to excessive temperatures. Another object of the invention is to provide an improved carbon black furnace. Other aspects, objects, and advantages of the invention will be apparent to those skilled in the art in view of this disclosure.

Thus, in accordance with the present invention, there is provided a process for producing carbon black, which process comprises: establishing a mass of hot oxidizing gases in a first zone; contacting a hydrocarbon feedstock with said first mass of hot combustion gases in said first zone; passing the resulting reaction mixture from said first zone into a second zone; in said second zone, contacting said reaction mixture with a mass of hot combustion gases produced by burning a second combustible mixture of an oxidant and a hydrocarbon fuel containing an amount of oxidant which is less than the stoichiometric amount of oxidant required for the burning of said fuel; and recovering carbon black product the resulting suspension of carbon black in hot gases.

Further in accordance with the invention, there is provided a carbon black furnace comprising, in combination: a generally cylindrical first section having a diameter greater than its length; a generally cylindrical second section having a length greater than its diameter and a diameter less than the diameter of said first section, said second section being connected to the downstream end of said first section in axial alignment and open communication therewith; a first inlet tunnel section having an outlet end and an inlet end, said outlet end of said tunnel being connected to and in communication with said first section; at least one other inlet tunnel section having an outlet end and an inlet end, said outlet end of said other tunnel being connected to and in communication with said first section at a point spaced apart from the point of connection of said first inlet tunnel; an insulator sleeve extending into said inlet end of said first inlet tunnel and defining an annular space between the outer periphery of said sleeve and the inner periphery of said first inlet tunnel; means for introducing an oxidant into the upstream end portion of said annular space; means for introducing a fuel into said annular space downstream from said oxidant introduction means; and a hydrocarbon feedstock conduit extending generally axially through said sleeve to a point adjacent the downstream end thereof.

In the practice of the invention the stream or mass of hot oxidizing gases with which the hydrocarbon feedstock or reactant is first contacted can be preheated air or one of the other oxidants discussed hereafter. However, it is preferred that said hot oxidizing gases be a stream of hot combustion gases produced by burning a combustible mixture of an oxidant and a hydrocarbon fuel containing an amount of oxidant which is greater than the stoichiometric amount required for the burning of said fuel. The only requirements on proportions of fuel and oxidant which can be burned to produce the streams of hot combustion gases used in the practice of the invention are that at least one of the combustible mixtures must contain less than the stoichiometric amount of oxidant and the other combustible mixture must contain more than the stoichiometric amount of said oxidant, and that said proportions be such that stable combustion conditions are obtained. It is presently preferred that the combustible mixture which contains less than the stoichiometric amount of oxidant will contain from about 60 to about 85 percent of the theoretical amount of oxidant, and that said combustible mixture (or mixtures) which contains more than the stoichiometric amount of oxidant will contain from about 125 to about 190 percent of the theoretical amount of oxidant. However, it is within the scope of the invention for said mixture which contains less than the stoichiometric amount of oxidant to contain from about 50 to about 85 percent of the theoreitcal amount of oxidant. When said mixture contains less than about 60 percent of oxidant it is preferred that said oxidant be preheated prior to mixing with the fuel. Preheat temperatures up to about 1200° F. can be employed in the practice of the invention. Usually a preheat temperature in the range of 400 to 1000° F. will be preferred.

A number of advantages are obtained in the practice of the invention. Included among these advantages is the increase in yield of carbon black, as mentioned above. Another advantage is the protection of the refractories of the furnace from excessive temperatures, as mentioned above. The invention makes it possible to control the temperatures in the inlet tunnels to said furnace zone, and also in the furnace zones downstream therefrom, by regulating the proportions of fuel and oxidant used to produce the hot combustion gases which are introduced into said first zone. If desired, the oxidant, e.g., air, can be preheated. This permits more efficient operations over a broader stoichiometric range than can otherwise be employed.

The oxidant most commonly used in the practice of the invention is air. Air is commonly preferred for convenience. However, other free oxygen-containing gases can also be used. Thus, the oxidant or free oxygen-containing gas can be air enriched with oxygen, essentially pure oxygen, or mixtures of oxygen with other gases. For convenience, the invention will be further described herein in terms of using air as the oxidant or free oxygen-containing gas. However, it is to be understood that the invention is not limited to the use of air.

The fuel used in forming the combustible mixtures burned to produce the hot combustion gases introduced into said first zone can be any suitable fuel, either liquid, solid, or gaseous. Generally speaking, a gaseous fuel such as natural gas or other normally gaseous hydrocarbons is preferred. Liquid hydrocarbon fuels are the next most preferred fuel.

FIG. 3 is a detailed view, partly in cross section, showing a burner and hydrocarbon feedstock introduction assembly which can be employed in a tunnel inlet of the furnace of FIGS. 1 and 2.

FIG. 4 and FIG. 5 illustrate details of the apparatus illustrated in FIG. 3.

Figure 1:
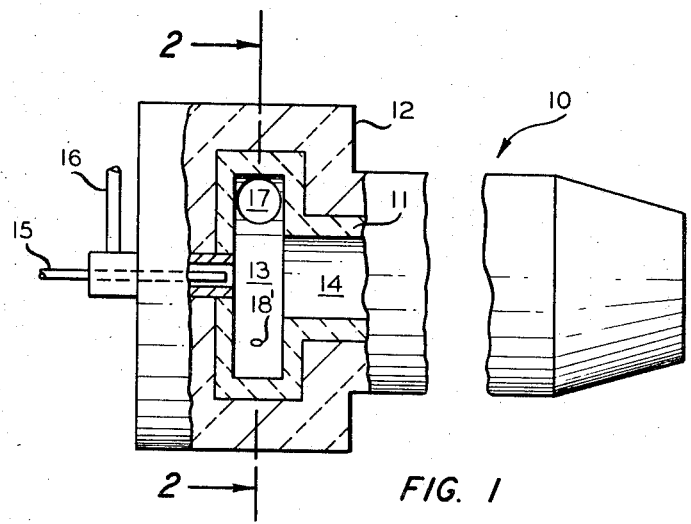
FIG. 1 is a view, partly in cross section, of one presently preferred type of furnace which can be employed in the practice of the invention.

Referring now to the drawings, wherein like reference numerals are employed to denote like elements, the invention will be more fully explained. Said drawings illustrate one presently preferred furnace 10 comprising a refractory (such as ceramic) lining 11 encased in an insulating shell 12. A metal shell (not shown in FIG. 1) usually encases the entire furnace assembly. The ceramic lining is shaped to form first section or chamber 13 and second section or chamber 14. Said second section 14 is axially aligned with and is smaller in diameter than said first section 13, and its length is greater than its diameter. Preferably, the length of said first section 13 is less than its diameter. An axially disposed inlet conduit 15 is positioned in the end wall of first section 13 as shown. If desired, a spray nozzle can be positioned on the downstream end of conduit 15 to spray conversion or "make" oil into chamber 13 when operating in accordance with the invention of said copending application. If the "make" hydrocarbon or feedstock is vaporous, the downstream end of conduit 15 is usually open. Surrounding said conduit 15 is a larger conduit which provides an annular space surrounding said feed conduit. A small amount of air can be passed via conduit 16 into said annular space. This "jacket air" is not essential. Only sufficient air is used to prevent possible carbon deposition on the outlet of conduit 15 and/or protect said conduits from possible excessive temperatures in section 13.

Said section 13 is provided with tangential inlet tunnels 17 and 17' which are usually two in number, although more than one can be employed. If desired, said first section 13 can also be provided with radial inlets 18 and 18' in addition to or instead of said tangential inlets 17 and 17'. Said radial inlets 18 and 18' can be structurally similar to said tangential inlets 17 and 17' but are here shown schematically so as to simply the drawings. Said radial inlets can be more than two in number if desired. It is also within the scope of the invention to employ one tangential inlet and one radial inlet, if desired.

FIG. 3 illustrates a presently preferred burner and feedstock introduction assembly which can be employed in one of the inlet tunnels 17 and 17', or in one of the inlet tunnels 18 and 18'. A cylindrical section 31 is disposed upstream of, in open communication with, substantially axially aligned with, and has a diameter larger than said inlet tunnel, e.g., 17'. Said section 31 thus comprises an extension of said inlet tunnel. It is not essential that said section 31 have a diameter greater than said inlet tunnel. For example, said section 31 can be a straight extension of and have the same diameter as said inlet tunnel. However, it is preferred that the diameter of section 31 be greater. A first sleeve 32 having a diameter less than said section 31 extends into said section from the upstream end thereof to provide an annular space 33 defined by the inner wall of said section 31 and the outer wall of said first sleeve. A second sleeve 34 has a smaller diameter than, and is concentrically mounted within, said first sleeve 32. Said sleeves 31 and 32 are preferably formed of a refractory material such as sillimanite, alumina, silicon carbide, or other refractory material suitable for the purpose. Refractory insulation 36 is disposed in the space between said first and second sleeves.

A fuel introduction ring 37 is disposed around said first sleeve 32 in said annular space 33 adjacent the upstream end of said precombustion section and is adapted to introduce fuel in a downstream direction into said annular space. Access for installation of fuel ring 37 is provided by means of removable plate 40 in the downstream face of flange 47. A fuel inlet conduit 38 is connected to said fuel introduction ring. An air distributing ring 39 surrounds said first sleeve and is adapted to introduce air tangentially into said annular space 33 as described further hereinafter in connection with FIG. 4. An air inlet conduit 41 is connected to said air distributing ring.

An annular closure flange 42 having an opening therein abuts the upstream end of said first sleeve and the upstream end of said second sleeve, thereby closing the upstream end of said annular space. Support bars 43 and 43' extend from the downstream face of said closure flange into the insulation between said first ring 32 and said second ring 34. A spacer sleeve 44 is disposed between said air distributing ring and said closure flange. A plurality of bolts 46 extends through said closure flange 42, said air distributing ring 39, and into the upstream face of flange 47. A first packing gland assembly 48 is mounted on the upstream side of said closure flange around the opening provided therein. An annular cooling fluid conduit 49, provided with an internal divider fin 51, extends movably through said first packing gland assembly 48, said opening in said closure flange 42, and extends concentrically within said second sleeve 34 in spaced apart relationship therewith, preferably to a point adjacent the downstream end of said second sleeve. Cooling fluid inlet and outlet conduit means, 52 and 53, respectively, are attached to said cooling fluid conduit 49 for the introduction and removal of cooling fluid therefrom.

A jacket gas conduit 54 is fixed to and extends through a closure plate 56 mounted on the upstream end of said cooling fluid conduit, and extends concentrically within said cooling fluid conduit in spaced apart relationship therewith, preferably to a joint adjacent the downstream end of said cooling fluid conduit. The spacing between the inner wall of cooling fluid conduit 49 and the outer wall of jacket gas conduit 54 is small but is sufficient to provide a dead air space which further aids in shielding said jacket gas conduit. Inlet conduit 55 is connected to said jacket gas conduit 54. A second packing gland assembly 57 is mounted at the upstream end of said jacket gas conduit. A feedstock reactant conduit 58 extends slidably through said second packing gland assembly 57 to a point preferably adjacent the downstream end of said jacket gas tube 54.

In FIG. 4 air distributing ring 39 comprises an inner ring 63 and an outer ring 64 having an air conducting channel 66 formed therebetween. The supply pipe 41 is connected in communication with the air distributing channel 66 from whence it passes through generally tangential passages 67 in communication with annular space 33, the mixture of air from pipe 41 and gas from pipe 38 passing through annular space 33 and burning therein to create hot combustion gases which surround the fluid hydrocarbon from conduit 58 in section 31 and in passing into tunnel 17'. Ports or passages 67 may be made radial, in which case there will not be any substantial whirling movement, or they can be made generally tangent to the inner surface of ring 63, in which case a helical motion of the air from ports 67 and the gas from openings 60 in fuel ring 37 pass helically down space 33 and then pass spirally into tunnel 17' surrounding the hydrocarbon from conduit 58 which is being introduced axially into tunnel 17'. Bolt holes 70 in ring 63 are for bolts 46 (FIG. 3) to hold it in position against flange 47 of FIG. 3, and said holes 70 do not connect with either channel 66 or with holes 67.

In carrying out one presently preferred embodiment of the invention, one of tangential inlet tunnels 17 and 17', e.g., 17' which communicates tangentially with section 13, is fitted with a burner and feedstock assembly essentially like that illustrated in FIG. 3. The other tangential tunnel 17 can be fitted with any other suitable means for introducing a combustile mixture into said tunnel, e.g., that shown in U.S. Patent 2,780,529. The combustible mixture introduced into tunnel 17' through said burner and feedstock assembly contains more than the stoichiometric amount of air necessary for burning the fuel contained in said mixture and combustion of said fuel is substantially complete. The combustible mixture introduced into the other of said inlet tunnels, e.g., 17, will contain less than the stoichiometric amount of air necessary for the burning of the fuel contained therein. The excess fuel contained in the mixture introduced into tunnel 17 passes into said section 13.

In the operation of said preferred embodiment of the invention, a fuel is introduced via conduit 38 into ring 37 and via the holes 60 in said ring 37 (see FIG. 5) into annular space 33. Air from ring 39 is introduced into said annular space 33 upstream from fuel ring 37. The resulting combustible mixture is ignited and the resulting swirling mixture of hot combustion gases passes out of annular space 33 and contacts a stream of hydrocarbon feedstock introduced via conduit 58. Formation of carbon black is initiated in the resulting reaction mixture by decomposition of said feedstock caused by the action of the heat contained in said hot combustion gases. Said reaction mixture enters tunnel 17' with a helical motion. Said reaction mixture passes from tunnel 17' into section 13 where it is contacted with the fuel-rich hot combustion gases introduced into said section 13 from inlet tunnel 17. The resulting admixture is then passed into section 14. Carbon black product is recovered from the gaseous effluent from section 14 by any suitable means known to the art. Thus, in the above-described preferred embodiment of the invention, carbon black formation is initiated in tunnel inlet 17', is carried further in section 13 where the reaction mixture from 17' is contacted with the fuel-rich hot combustion gases prior to completion of the carbon black formation, and is then completed in section 14. The resulting suspension of carbon black in hot gases is then quenched by means of a quench fluid introduced from a quench inlet (not shown) located near the outlet of section 14, and carbon black is recovered from the effluent from section 14.

In another embodiment of the invention the hot oxidizing gases introduced into said inlet tunnel 17' can be air or other oxidant, as defined herein, instead of said hot combustion gases.

While the invention has been described with particular reference to employing a burner and feedstock introduction assembly like that illustrated in FIG. 3 in one of inlet tunnels 17 or 17' or in one of inlet tunnels 18 or 18', the invention is not so limited. Any other suitable means for the introduction of a stream of hot combustion gases into one of said inlet tunnels, and introducing a stream of hydrocarbon feedstock into said tunnel downstream from the point of introduction of the mixture of hot combustion gases, can be employed in the practice of the invention. Also, while the furnace of FIG. 1 has been described with particular reference to producing hot combustion gases in inlet tunnels 17 or 17', or in inlet tunnels 18 and 18', the invention is not so limited. The hot combustion gases can be produced in combustion zones which are not directly connected to section 13, and merely introduced via inlet openings.

Figure 2:
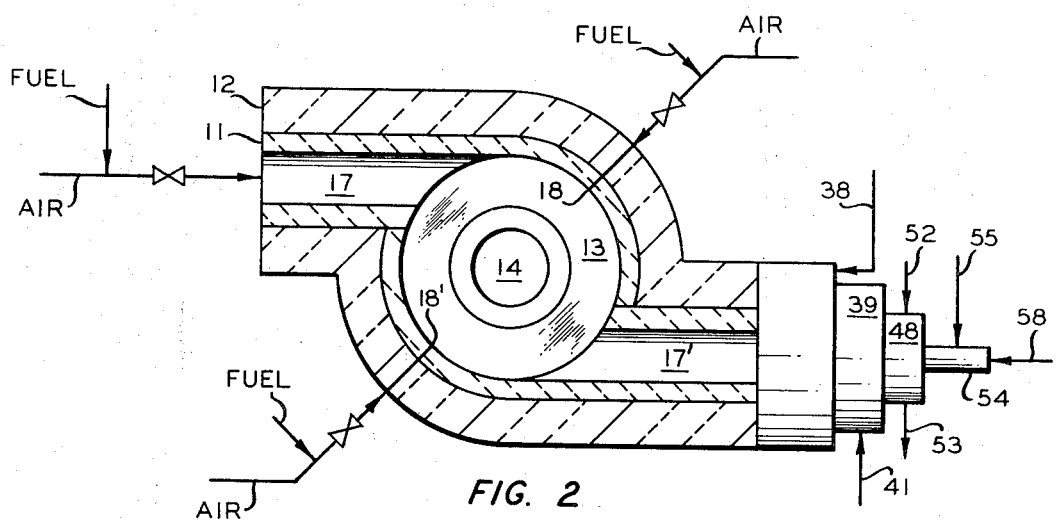
FIG. 2 is substantially a cross section along the lines 2—2 of FIG. 1, with the means for introducing fuel and air, and fuel, air, and make hydrocarbon, into the various inlet tunnels shown diagrammatically.
Figure 6:
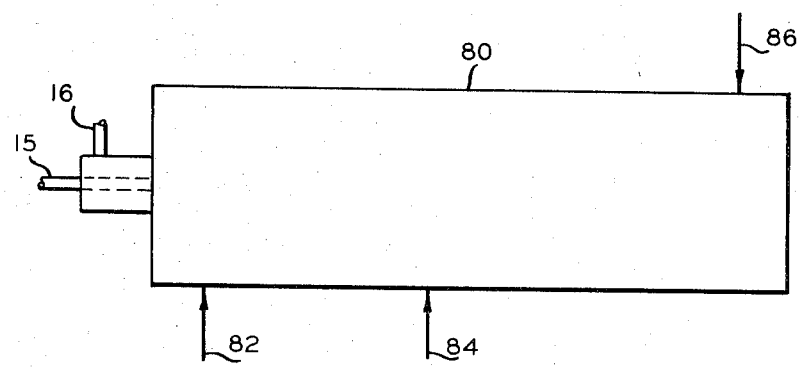
FIG. 6 is a schematic illustration of another type of furnace which can be employed in the practice of the invention.

The furnace illustrated schematically in FIG. 6 comprises a single elongated cylindrical section or chamber 80 which is formed with a liner of highly refractory material such as sillimanite, alumina, or other refractory material suitable for the temperatures encountered, a cylindrical steel shell, and a layer of insulation between said shell and said liner similarly as in the furnace illustrated in FIG. 1. In the upstream or inlet end wall of chamber 80 there is provided a feed conduit introduction assembly 15 essentially like that illustrated in FIG. 1. Conduit 16 is provided for the introduction of "jacket air," similarly as in the furnace illustrated in FIG. 1. At least one inlet 82 is provided into that portion of chamber 80 near inlet feed pipe 15. Each inlet 82 provides means for the introduction of a first mass or stream of hot combustion gases into the upstream end portion of the furnace or reaction zone. Said inlet or inlets 82 can enter chamber 80 tangentially or radially or any desired direction with respect to the inner periphery of chamber 80. Tangential entry is frequently preferred. At least one additional inlet 84, which can also be tangential or radial, is provided a finite distance longitudinally downstream from said inlet 82. Said inlet 84 provides means for the introduction of a second stream or mass of hot combustion gases. Preferably, a quench inlet 86 is provided near the discharge end of chamber 80. It will be understood that said inlets 82 and 84 can be tunnel inlet zones, similarly as described above in connection with FIG. 2, and can be employed for generation of hot combustion gases therein or the introduction of hot combustion gases from an outside source. Thus, if desired, feedstock introduction assembly 15–16 can be omitted and inlet 82 provided wtih a burner and feedstock introduction assembly like that illustrated in FIG. 3, similarly as for inlet 17'.

In one presently preferred method of operating in accordance with the invention when employing a furnace like that illustrated in FIG. 6, a hydrocarbon reactant is continuously introduced through said inlet 15 while, at the same time, a first stream of hot oxidizing gases is introduced via inlet 82. Said first stream of hot oxidizing gases is preferably a stream of hot combustion gases formed by burning a first combustible mixture of an oxidant and a hydrocarbon fuel containing an amount of oxidant which is greater than the stoichiometric amount of oxidant required for the burning of said fuel. This results in initiating conversion of the hydrocarbon reactant to carbon black by the action of the heat contained in said gases in the first section or zone surrounding and downstream from said inlet 82. The resulting reaction mixture passes downstream in chamber 80 and, prior to completion of the formation of said carbon black, is contacted in a second section or zone with a second stream of hot combustion gases introduced via inlet 84. Said inlet 84 thus forms or defines a boundary location between said first zone and said second zone. Said second stream or mass of hot combustion gases is produced by burning a second combustible mixture of an oxidant and a hydrocarbon fuel containing an amount of oxidant which is less than the stoichiometric amount of oxidant required for the burning of the fuel therein. The resulting admixture is passed downstream in chamber 80 with formation of the carbon black product being completed in the region downstream from said inlet 84. The resulting suspension of carbon black in hot gases is then quenched by means of a quench fluid introduced via conduit 86 near the outlet of the chamber 80 in known manner.

In the practice of the invention the amount or volume of the second stream of hot combustion gases will usually be within the range of from 20 to 70, preferably 40 to 60, volume percent of the total amount or volume of hot gases introduced into the process, e.g., the sum of the volume of the first stream of hot combustion gases plus the volume of the second stream of hot combustion gases. Frequently, optimum results will be obtained when each of said first and second streams of hot combustion gases is about 50 volume percent of the total amount of hot combustion gases. As will be understood by those skilled in the art, in combustion type processes for the manufacture of carbon black the air-to-oil (hydrocarbon reactant or feedstock) ratio can be varied within wide limits depending upon the properties, e.g., surface area, desired in the carbon black product. Generally speaking, in the practice of this invention said air-to-oil ratio can be within the range of from 200 to 1500, preferably 250 to 1250, cubic feet of air per gallon of liquid hydrocarbon feedstock. As used herein, the air-to-oil ratio refers to the ratio of total air used.

The following example will serve to further illustrate the invention.

EXAMPLE

A series of runs for the production of carbon black was carried out in a furnace embodying the essential features of the furnace illustrated in FIGS. 1–5 of the drawings. In the furnace employed, first section 13 was 15.75 inches in diameter and 4.75 inches in length. Second section 14 was 4 inches in diameter and about 62 inches in length. Inlet tunnels 17 and 17' were 4.5 inches in diameter and had a length of approximately 17 inches along the short side thereof. The space downstream of insulator 36 and upstream from tunnel 17' was about 2.5 inches in length. Section 31 was 6.25 inches in internal diameter. The dimensions of the other elements of the furnace were generally proportional to those given above. All the above dimensions are given by way of example only, are not limiting on the invention, and any and all of said dimensions can be varied within the scope of the invention. The hydrocarbon feedstock used in this series of runs was benzene having, by definition, a Bureau of Mines Correlation Index of 100. Operating conditions, yields of carbon black, and tests on the carbon black products are set forth in Table I below.

TABLE I

| | Run number | | | | | |
|---|---|---|---|---|---|---|
| | 1 | 2 | 3 | 4 | 5 | 6 |
| Feedstock: | | | | | | |
| Axial feed, lbs./hr | 75.5 | 11.8 | 37.5 | 62.5 | | |
| Axial feed temp., °F | 482 | 421 | 450 | 502 | | |
| Tunnel feed, lbs./hr | | 23.3 | 36.6 | | 54.2 | 56.2 |
| Tunnel feed, °F | | 463 | 428 | | 460 | 345 |
| Air rates: | | | | | | |
| Jacket air, s.c.f.h | 179 | 179 | 179 | 179 | 0 | 179 |
| Tangential inlet 17, s.c.f.h | 3,020 | 3,000 | 3,010 | 2,980 | 3,000 | 3,000 |
| Tangential inlet 17', s.c.f.h | 3,020 | 3,000 | 3,010 | 2,980 | 3,000 | 3,000 |
| Tangential inlet 17, percent stoichiometric | 150 | 65 | 150 | 75 | 65 | 65 |
| Tangential inlet 17,' percent stoichiometric | 150 | 150 | 150 | 150 | 151 | 150 |
| Propane fuel rates: | | | | | | |
| Tangential inlet 17, s.c.f.h | 85 | 196.5 | 85.1 | 169 | 197 | 196.5 |
| Tangential inlet 17', s.c.f.h | 85 | 85 | 85.1 | 85 | 84.8 | 85 |
| Carbon black product: | | | | | | |
| Yield, lbs./gal. feed | 3.52 | 2.83 | 3.90 | 4.35 | 4.54 | 4.86 |
| Yield, percent C in feed | 51.8 | 41.8 | 57.5 | 64.2 | 67.5 | 72.0 |
| Photelometer | 94 | 92 | 88 | 91 | 91 | 86 |
| $N_2$ surface area, sq. m./g | 84 | 76.9 | 57.3 | 87 | 50.9 | 52.8 |

Referring to Table I, Run 1 is a control run carried out in accordance with the prior art with all of the hydrocarbon feedstock being introduced into the furnace axially and using balanced stoichiometric conditions, i.e., burning the said air-rich combustible mixture in both of tangential inlet tunnels 17 and 17'. Run 4 was carried out in accordance with the invention of said copending application, e.g., all of the hydrocarbon feedstock was introduced axially, an air-rich combustible mixture was burned in one of tangential inlet tunnels 17 and 17', and a fuel-rich combustible mixture was burned in the other of said tangential inlet tunnels. Runs 2 and 3 are additional control runs wherein a portion of the hydrocarbon feedstock was introduced axially and another portion of said feedstock was introduced into tangential inlet tunnel 17'. Runs 5 and 6 were carried out in accordance with the invention. In Runs 2, 3, 5 and 6 the inlet end of tunnel inlet 17' was fitted with a burner and feedstock introduction assembly essentially like that illustrated in FIG. 3. In Runs 1 and 4 both of tunnel inlets 17 and 17' were fitted with conventional burner means similar to that illustrated in said U.S. Patent 2,780,529.

Comparing Run 4 with Run 1, it will be noted there was obtained a substantial increase in carbon black yield in Run 4 in accordance with the invention of said copending application. However, comparing Runs 5 and 6 with said Run 4, and also with control Run 1, shows that the yield of carbon black obtained in said Runs 5 and 6 was considerably greater when operating in accoradnce with the present invention. Comparing Runs 2 and 3 with Run 4, and also with Runs 5 and 6, shows that it is desirable to introduce all of the hydrocarbon feedstock axially as in said copending application, or introduce all of said hydrocarbon feedstock into one of the inlet tunnels in accordance with the persent invention, in order to obtain maximum yield of carbon black product.

While the invention has been particularly illustrated using benzene as the hydrocarbon feedstock, the invention is not so limited. Another preferred feedstock comprises a conventional aromatic concentrate oil obtained by the sulfur dioxide extraction of cycle oils obtained in the catalytic cracking of gas oils. Such oils will typically have an API gravity in the range of about 8 to about 10 and a BMCI value in the range of about 85 to about 100. However, other conventional aromatic oils used in the production of furnace carbon blacks and which can include oils other than extract oils produced by liquid sulfur dioxide extraction of cycle oils, can be used in the parctice of the invention. Typical properties of conventional aromatic concentrate oils are: boiling range, 400–1000° F.; BMCI, 75 to 150; and an API gravity of from about 0 to about 20°.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in my process. However, the normally liquid hydrocarbons are preferred, and the normally liquid aromatic hydrocarbons are more preferred, because of the higher yields obtained therefrom. The feed can be injected as a liquid through a spray or atomizer, or the feed can be injected as a vapor. Hydrocarbons from other sources than petroleum likewise are suitable, as for example, low temperature coal gas, coal tar distillates, shale gases and distillates can be used. These feedstocks may contain most any class of hydrocarbon compound, as for example, saturated or unsaturated hydrocarbons, paraffins, olefins, aromatics, naphthenes, or any others which might become available.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. In a process for producing carbon black in which a hydrocarbon feedstock is contacted with a first mass of hot combustion gases in a first zone and the resulting mixture is passed into a second zone in which said mixture is contacted with a second mass of hot combustion gases to produce a suspension of carbon black in gases and said carbon black is recovered from said suspension, the improvement comprising producing said first mass of hot combustion gases in a first tunnel inlet zone communicating radially with said second zone by burning a combustible mixture of an oxidant and a hydrocarbon fuel containing an amount of oxidant which is greater than the stoichiometric amount of oxidant required for the burning of said fuel, and producing said second mass of hot combustion gases in a second tunnel inlet zone communicating radially with said second zone by burning a combustible mixture of an oxidant and a hydrocarbon fuel containing an amount of oxidant which is less than the stoichiometric amount of oxidant required for the burning of said fuel, said first tunnel inlet zone being said first zone, said second mass of hot combustion gases being passed from said second tunnel inlet zone into said second zone.

2. A process according to claim 1 wherein said first and said second tunnel inlet zones communicate tangentially with said second zone and said suspension of carbon black is passed from said second zone into a third zone and said carbon black product is recovered from the effluent from said third zone.

3. A process according to claim 2 wherein the amount of oxidant in said first combustible mixture is within the range of from 125 to 190 percent of the stoichiometric amount required for the burning of said fuel; and the amount of oxidant in said second combustible mixture is within the range of from 50 to 85 percent of the stoichiometric amount required for the burning of said fuel.

4. A process according to claim 3 wherein the amount of oxidant in said second combustible mixture is within the range of from about 60 to 85 percent of the stoichiometric amount required for the burning of said fuel.

5. A process according to claim 3 wherein said oxidant is air.

6. A process according to claim 5 wherein said hydrocarbon fuel is a normally gaseous fuel.

7. A process according to claim 6 wherein said first mass of hot combustion gases is produced by burning a combustible mixture containing about 150 percent of the stoichiometric amount of air and said second mass of hot combustion gases is produced by burning a combustible mixture containing about 65 percent of the stoichiometric amount of air.

8. A process according to claim 1 wherein the oxidant used in said first mass of hot combustion gases is introduced tangentially into said first tunnel inlet zone and imparts a helical swirl to said first mass of hot combustion gases.

References Cited

UNITED STATES PATENTS

| | | | |
|---|---|---|---|
| 2,419,565 | 4/1947 | Krejci | 23—209.6 |
| 3,235,334 | 2/1966 | Helmers | 23—209.4 |
| 3,355,247 | 11/1967 | Krejci et al. | 23—209.4 |
| 3,362,789 | 1/1968 | Hardy et al. | 23—209.4 |
| 3,445,190 | 5/1969 | Kallenberger | 23—209.4 |

EDWARD J. MEROS, Primary Examiner

U.S. Cl. X.R.

23—259.5